United States Patent
Teggatz et al.

(10) Patent No.: US 9,602,167 B2
(45) Date of Patent: Mar. 21, 2017

(54) REMOTE ENERGY TRANSFER SYSTEM

(71) Applicant: Triune Systems, LLC, Plano, TX (US)

(72) Inventors: Ross E. Teggatz, McKinney, TX (US); Jonathan Knight, Yokohama (JP); Ken Moore, Dallas, TX (US); Emanuel Stingu, Dallas, TX (US)

(73) Assignee: TRIUNE SYSTEMS, LLC, Plano, TX (US)

(*) Notice: Subject to any disclaimer, the term of this patent is extended or adjusted under 35 U.S.C. 154(b) by 868 days.

(21) Appl. No.: 13/852,780

(22) Filed: Mar. 28, 2013

(65) Prior Publication Data

US 2013/0257172 A1  Oct. 3, 2013

Related U.S. Application Data

(60) Provisional application No. 61/616,860, filed on Mar. 28, 2012.

(51) Int. Cl.
*H04B 5/00* (2006.01)
*H04B 5/02* (2006.01)

(52) U.S. Cl.
CPC .......... *H04B 5/0037* (2013.01); *H04B 5/0031* (2013.01); *H04B 5/02* (2013.01)

(58) Field of Classification Search
CPC .......... H04B 5/0037; H04B 5/31; H04F 38/14
USPC ........................................... 307/104
See application file for complete search history.

(56) References Cited

U.S. PATENT DOCUMENTS

| 5,450,076 A * | 9/1995 | Donig | G06K 7/0008 |
| --- | --- | --- | --- |
| | | | 323/356 |
| 8,957,549 B2 * | 2/2015 | Kesler | 307/104 |
| 2004/0005898 A1 * | 1/2004 | Kato | H04W 36/06 |
| | | | 455/450 |
| 2007/0010295 A1 * | 1/2007 | Greene | G06K 19/0707 |
| | | | 455/572 |
| 2009/0243394 A1 * | 10/2009 | Levine | H02J 5/005 |
| | | | 307/104 |
| 2009/0247199 A1 * | 10/2009 | Oodachi | H02J 17/00 |
| | | | 455/500 |
| 2010/0097894 A1 * | 4/2010 | Kubota | B24B 53/00 |
| | | | 367/197 |
| 2010/0146308 A1 * | 6/2010 | Gioscia | G06F 1/1632 |
| | | | 713/300 |
| 2010/0244579 A1 * | 9/2010 | Sogabe | H02J 7/025 |
| | | | 307/104 |
| 2011/0285212 A1 * | 11/2011 | Higuma | H02J 5/005 |
| | | | 307/104 |

(Continued)

FOREIGN PATENT DOCUMENTS

WO   WO 2010104569 A1 *  9/2010  .......... A61N 1/0553

*Primary Examiner* — Jared Fureman
*Assistant Examiner* — James Evans
(74) *Attorney, Agent, or Firm* — Jackson Walker LLP; Christopher J. Rourk

(57) ABSTRACT

A remote energy transfer system is provided that is capable of wirelessly transmitting data and power through barriers. Generally, the remote energy transfer system comprises at least one power antenna, at least one data antenna, and at least one link controller operatively coupled to the power antenna and the data antenna. The link controller can be configured to at least partially control the energy transfer from the power antenna and the data transfer of the data antenna.

20 Claims, 9 Drawing Sheets

(56) References Cited

U.S. PATENT DOCUMENTS

| | | | |
|---|---|---|---|
| 2012/0032632 A1* | 2/2012 | Soar | H01F 38/14 |
| | | | 320/108 |
| 2012/0235508 A1* | 9/2012 | Ichikawa | H02J 7/0021 |
| | | | 307/104 |
| 2015/0130287 A1* | 5/2015 | Steudtner | E05D 11/0081 |
| | | | 307/104 |

* cited by examiner

REMOTE ENERGY TRANSFER SYSTEM

PRIORITY ENTITLEMENT

This application is entitled to priority based on Provisional Patent Application Ser. No. 61/616,860 filed on Mar. 28, 2012, which is incorporated herein by reference in its entirety. This application and the Provisional Patent Application have at least one common inventor.

TECHNICAL FIELD

The disclosure relates to energy transfer systems. More particularly, the disclosure relates to a system for remote energy transfer.

BACKGROUND

Energy sources are typically used with electronic systems. Many systems that are used, such as security electronics, require wiring that must be installed through various external barriers such as walls, windows, and the like. This wiring through barriers may significantly increase the cost of the systems, potentially compromise the environmental isolation of the system, and introduce potential breaches in security barriers of the system. Although advancements have been made in the field of electronic systems, improvements are still needed for transferring energy and data through barriers.

SUMMARY

In one embodiment of the present invention, a remote energy transfer system is provided. The remote energy transfer system comprises at least one power antenna, at least one data antenna, and at least one link controller operatively coupled to the power antenna and the data antenna. The link controller is configured to at least partially control the energy transfer from the power antenna and at least partially control the data transfer from the data antenna.

In another embodiment of the present invention, a remote energy transfer system is provided. The remote energy transfer system comprises at least one link controller, at least one power antenna, at least one data antenna, at least one power device, and at least one data device. In such an embodiment, the power antenna, the data antenna, the power device, and the data device are all operatively coupled to the link controller.

In yet another embodiment of the present invention, a method of remote energy transfer is provided. The method comprises the steps of receiving at least one energy transfer signal, receiving at least one data transfer signal, determining a link performance at least partially based upon the energy transfer signal and the data transfer signal, and generating a link controller setting signal at least partially based upon the link performance.

BRIEF DESCRIPTION OF THE DRAWINGS

The present disclosure will be more clearly understood from consideration of the following detailed description and drawings in which.

Figure 1:
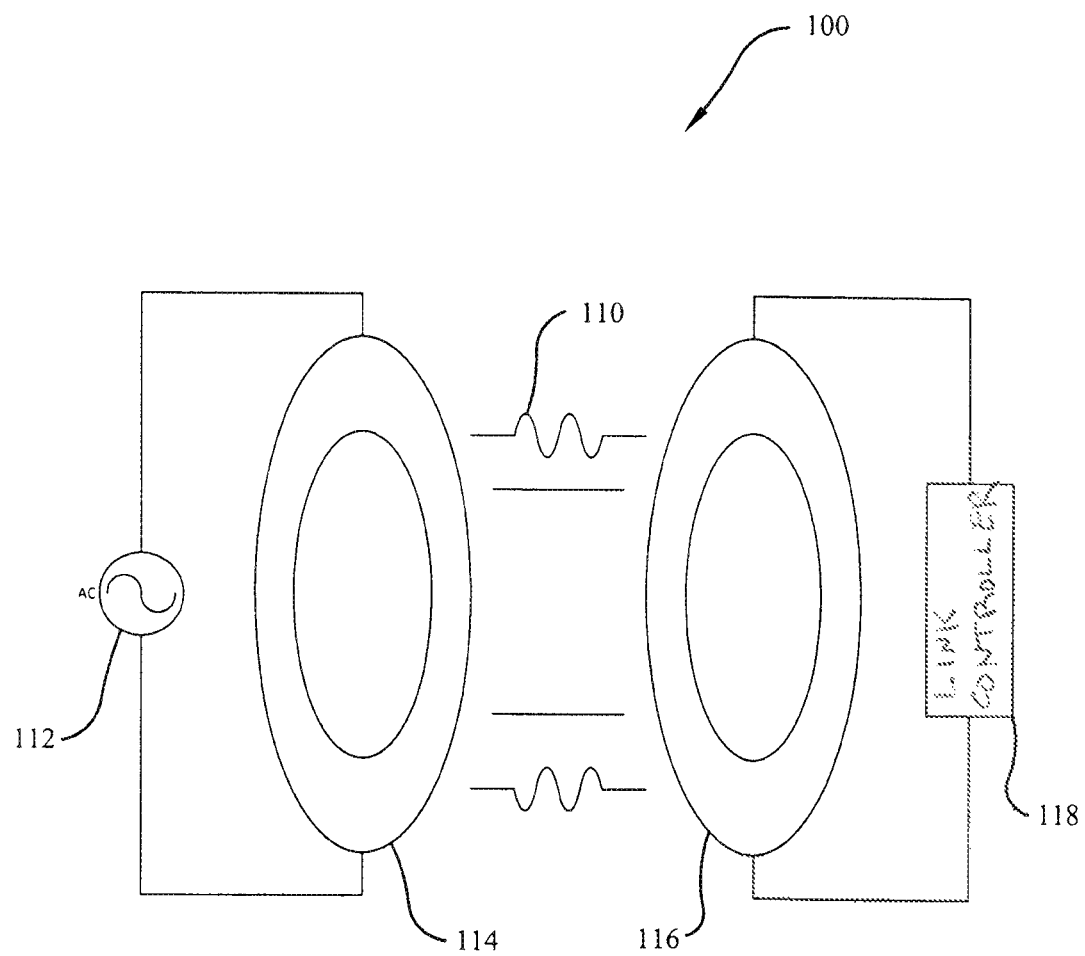
FIG. 1 depicts one embodiment of a remote energy transfer system.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION

In the security market, there is need for an electronic system that is easy to setup, minimizes costs, highly reliable, and provides accurate detection and defense if threats to the system and its barriers are detected. The method and system described herein are able to enhance and facilitate the operation of electronic systems that utilize and rely on barriers to isolate the system. For example, such systems can include security systems and fish finding systems. The present invention is directed to a method and system configured to transfer power and data through barriers wirelessly. In one or more embodiments, the systems described herein can utilize near-field data transmissions and/or inductively-coupled power and data transmissions in order to provide more secure data transmissions. Furthermore, a barrier such as, for example, a glass window, a wall, or other non-conductive materials, may be present between the data transmitter and data receiver of the systems described herein. In various embodiments, one or more transmission frequencies for data and/or power may be utilized in the system to link data and power sources on one side of a barrier to data and power loads on the other side of the barrier.

The present disclosure is also directed to the use of magnetic and/or voltage energy couplings to address the above-noted problems with previous electronic security systems. The magnetic and/or voltage energy couplings may power the system remotely, receive power remotely for the system from a source outside of the barrier, and provide a communication link through the barrier to electronics inside or outside of the barrier without compromising the integrity of the barrier. In addition, under the circumstances that the barrier is compromised, a wireless power and data link may provide a means to alert a central system that a barrier breach has occurred. In one or more embodiments, the system described herein comprises one or more power sources. The power sources may comprise a solar cell, a piezoelectric energy harvesting element, a radio frequency harvesting element, an electro-static discharge harvesting element, a Seebeck energy harvesting element, an alternating current driven power supply, a direct current driven power supply, or combinations thereof. Furthermore, an energy harvesting device may be utilized as a power source and/or as an alternative means to acquire and transmit data as a sensor or from a sensor.

The advantages of the systems described herein can include, for example, improved barrier security and increased freedom for electronic device placement. These and other potential advantageous, features, and benefits of the present disclosure may be understood by one skilled in the arts upon careful consideration of the representative examples of the disclosure in connection with the accompanying drawings. In various embodiments, the system described herein comprises at least one power antenna for transmitting energy and at least one data antenna for transmitting data. In one embodiment, the power antenna and the data antenna can be the same antenna. In alternative embodiments, the power antenna and the data antenna are separate antennas. In one or more embodiments, the system described herein comprises one or more data devices. These data devices can include, for example, a security camera, a motion detector, an infrared detector, and a keypad.

In one or more embodiments, the unprotected side of the barrier may utilize a data device such as a camera, a motion detector, an infrared sensor, or a combination thereof to monitor and detect outside threats. In such embodiments, the power and data may be transmitted uni-directionally or bi-directionally through the barrier. In the event that the barrier is a glass pane, the wireless link may also serve as an additional sensing device. If the communication link is broken by the window pane being broken, the window being opened, or the outside detector being removed, the communication handshake to and from the central unit and the load will cease to function correctly. The interruptions in the communication of the handshaking may be used to trigger an alarm that the barrier and/or monitoring load may have been compromised.

In one or more embodiments, a power source may be used to generate an alternating current (AC) waveform for the system. The alternating current waveform may create a magnetic field in at least one power transmission antenna that is subsequently received by at least one other power transmission antenna and converted back into electrical power that may then be directed to a load. Variations of this embodiment may be achieved by utilizing resonating circuitry. The linking, transmission, and reception of power may be unidirectional or bidirectional, depending on the application.

In certain embodiments, near-field data may also be coupled to the system. Near-field wireless transmission generally allows higher transfer efficiencies compared to far-field wireless transmission; in addition, radiated emissions may be controlled to a higher degree during near-field wireless transmissions. In one embodiment, the system comprises two separate data antennas and two separate power transmission antennas. In various embodiments, the same antenna may be utilized with differing tap-points for differing frequencies of interest. In embodiments where separate data and power transmission antennas are utilized, the data transmission antennas may be placed coaxially with the power transmission antennas. Additionally, the data antennas can be placed either within the inner perimeter or around the outer perimeter of the power transmission antennas and/or overlap them. Power and data may be transmitted and received uni-directionally and/or bi-directionally. In the case of wireless data transfer, the systems described herein may provide also additional protection from side channel attacks from entities trying to decipher information being transferred through wireless communication. In another embodiment, a far-field wireless interface, such as an RF transmitter or transceiver, may be utilized in the system to communicate to a central decision making unit.

It is envisioned that the system described herein may be utilized in totally off-grid situations, meaning that the system may harvest energy from alternative energy sources such as, for example, heat gradients, static discharge, vibration, light, and the like. In one or more embodiments, energy harvesting elements may be utilized for supplying energy to the system. Furthermore, an energy harvesting element may be placed on the outside of the barriers and/or inside the barriers if an energy source is available. In certain embodiments, energy harvesting elements may utilize wireless data and power to transfer energy between an external monitoring load and an internal control side. Consequently, this may allow the system described herein to be self-powered. In such an embodiment, the system may or may not contain an energy storage device. An energy storage device can comprise, for example, a battery.

In certain embodiments, the energy harvesting elements may also be utilized as sensors. For example, an energy harvesting element, such as a solar cell, may be utilized as a motion detector as well as a solar harvesting device. In another embodiment, a piezo-element may be utilized as a motion/vibration detector. In yet another embodiment, a Seebeck element may be utilized as a thermal detector and a touch sensor. In various embodiments, it is envisioned that the energy harvesting elements may be utilized in combination with other sensing and monitoring devices. For example, a thermal sensing device could be utilized in combination with a Seebeck element. In one or more embodiments, the energy harvesting elements may be utilized with a wired or wireless interface.

In one embodiment, hand signals in front of a solar cell may be detected by the system on the other side of the barrier. In such an embodiment, the hand signals' disruption of light onto the solar cell may be translated into binary code. This may be achieved, for example, by waving a hand in front of a solar cell or flashing a light source at the solar cell. In certain embodiments, a pattern of binary code may be utilized to place the system in a test mode to check the system or send a password to power down the system. In various embodiments, other energy harvesting units may be utilized in a similar manner, such as by touch, which may create vibrations, thermal gradients, or pressure gradients and be detected by the system.

In one or more embodiments, the system comprises one or more link controllers configured for sensing and monitoring loads. In such embodiments, system controls may be placed at the link controllers. In various embodiments, the link controller may comprise a transceiver, a transmitter, a receiver, or combinations thereof. In certain embodiments, combinations of frequencies may be utilized to propagate energy from one or more sources and to one or more sources.

In carrying out the principles of the present disclosure, the system and method described herein provides advances in the arts directed to the transfer of energy and data. In particular, the systems and methods described herein allow for energy and data to readily transfer across solid barriers. The systems described herein can be used, for example, in security systems and fish finding systems.

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. The disclosed subject matter should not be limited to any of examples set forth herein. These examples are provided so that this disclosure will be thorough and complete, and will fully convey the scope of the disclosed subject matter to those skilled in the art. The principle features of this disclosure may be employed in various examples while remaining within the scope of the disclosure.

The terminology used herein is for the purpose of describing particular examples and is not intended to be limiting of the disclosed subject matter. Like number refer to like elements throughout. As used herein the term "and/or" includes any and all combinations of one or more of the associated listed items. Also, as used herein, the singular forms "a," "an," and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

FIG. 1 depicts a remote energy transfer system 100 transferring at least one energy transfer signal 110 generated by a power source 112 from a power antenna 114 to another power antenna 116 operably coupled to a link controller 118.

Figure 2:
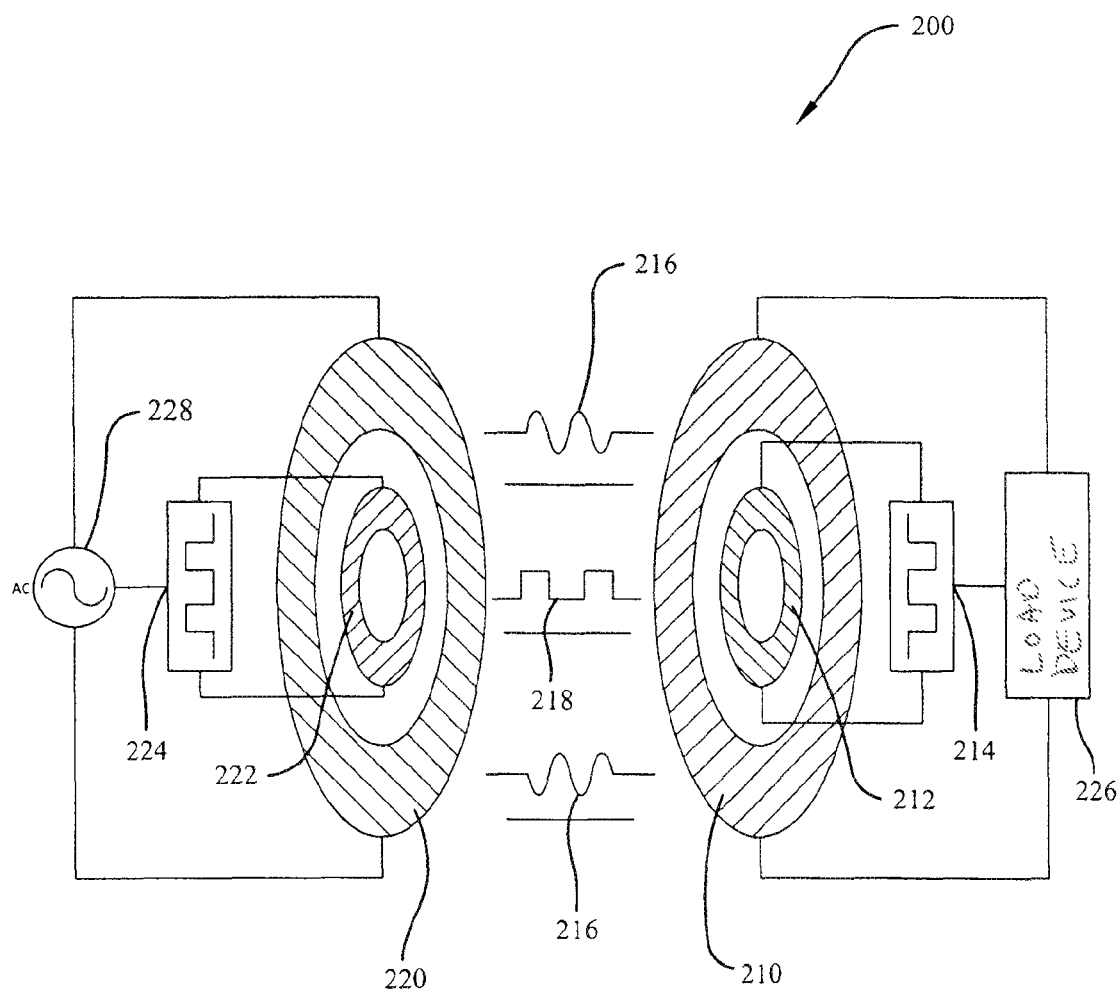
FIG. 2 depicts one embodiment of a remote energy transfer system.

FIG. 2 depicts a remote energy transfer system 200 comprising a power antenna 210, a data antenna 212, and a link controller 214. The link controller 214 controls the energy transfer 216 of at least one energy signal from the power antenna 210 and the data transfer 218 of at least one data signal from the data antenna 212. As shown in FIG. 2, the data antenna 212 may comprise a tapped portion of the power antenna 210. The link controller 214 may comprise a transceiver, a transmitter, and/or a receiver. Furthermore, the operable coupling of the link controller 214 may be bidirectional and/or unidirectional. The system 200 also comprises at least one other power antenna 220 operatively coupled to the power antenna 210, at least one other data antenna 222 operatively coupled to the data antenna 212, and at least one other link controller 224 operatively coupled to the other power antenna 220 and the other data antenna 222. In addition, the other link controller 224 is operably coupled to the link controller 214. Additionally, at least one load device 226 is operably connected to the power antenna 210. Finally, the system contains a power source 228.

Figure 3:
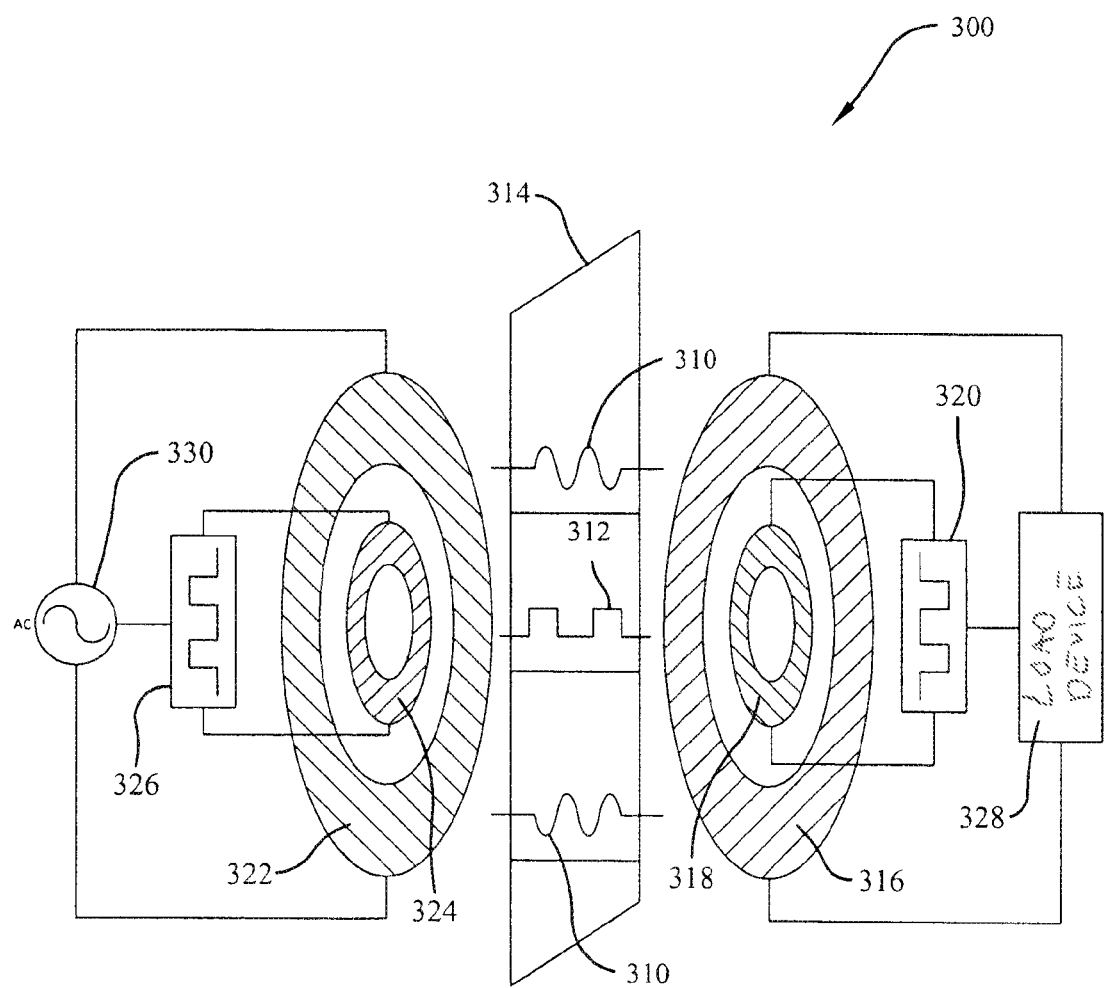
FIG. 3 depicts one embodiment of a remote energy transfer system.

FIG. 3 shows the remote energy transfer system 300 originally depicted in FIG. 2 except that the energy transfer signal 310 and the data transfer signal 312 are communicated across a barrier 314. As in FIG. 2, the system 300 comprises a power antenna 316, a data antenna 318, a link controller 320, another power antenna 322, another data antenna 324, another link controller 326, a load device 328, and a power source 330.

Figure 4:
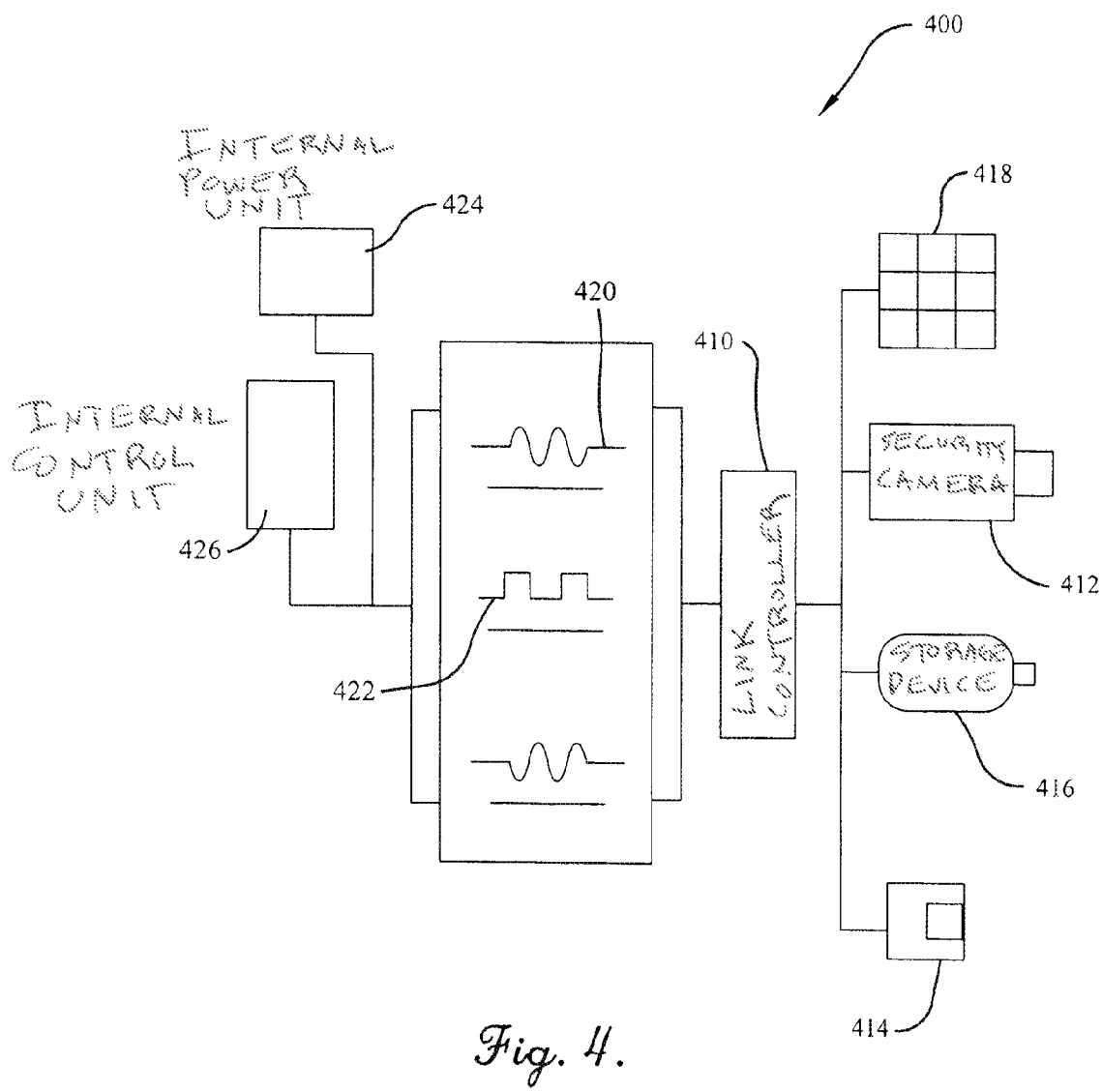
FIG. 4 depicts one embodiment of a remote energy transfer system.

FIG. 4 depicts a remote energy transfer system 400 comprising at least one data device communicably coupled to a link controller 410. The system 400 comprises at least one security camera 412, at least one infrared or motion detector 414, at least one storage device 416, and at least one keypad 418. In this embodiment, the remote energy transfer system 400 transfers energy transfer signals 420 and data transfer signals 422 utilizing coupling between the power and data antennas. Power is provided to the system from an internal power unit 424. Furthermore, an internal control unit 426 controls the data transfer to and from the system.

Figure 5:
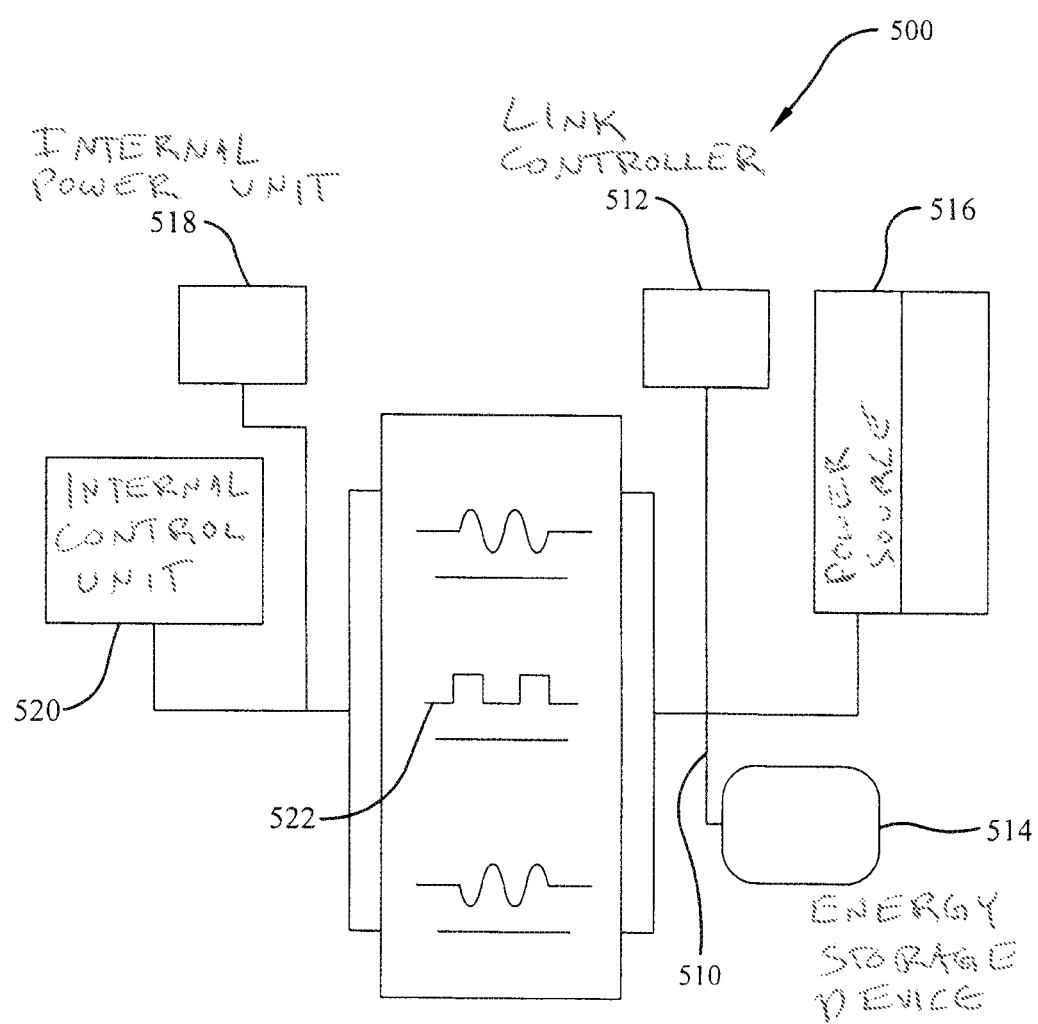
FIG. 5 depicts one embodiment of a remote energy transfer system.

FIG. 5 depicts a remote energy transfer system 500 comprising an energy storage interface 510 operatively coupling a link controller 512 to an energy storage device 514 and at least one power source 516 operatively coupled to the link controller 512. In this embodiment, the power source 516 comprises a solar cell. The system further comprises an internal power unit 518 for providing and controlling power to the system and an internal control unit 520 for controlling the data transfer 522 to and from the system.

Figure 6:
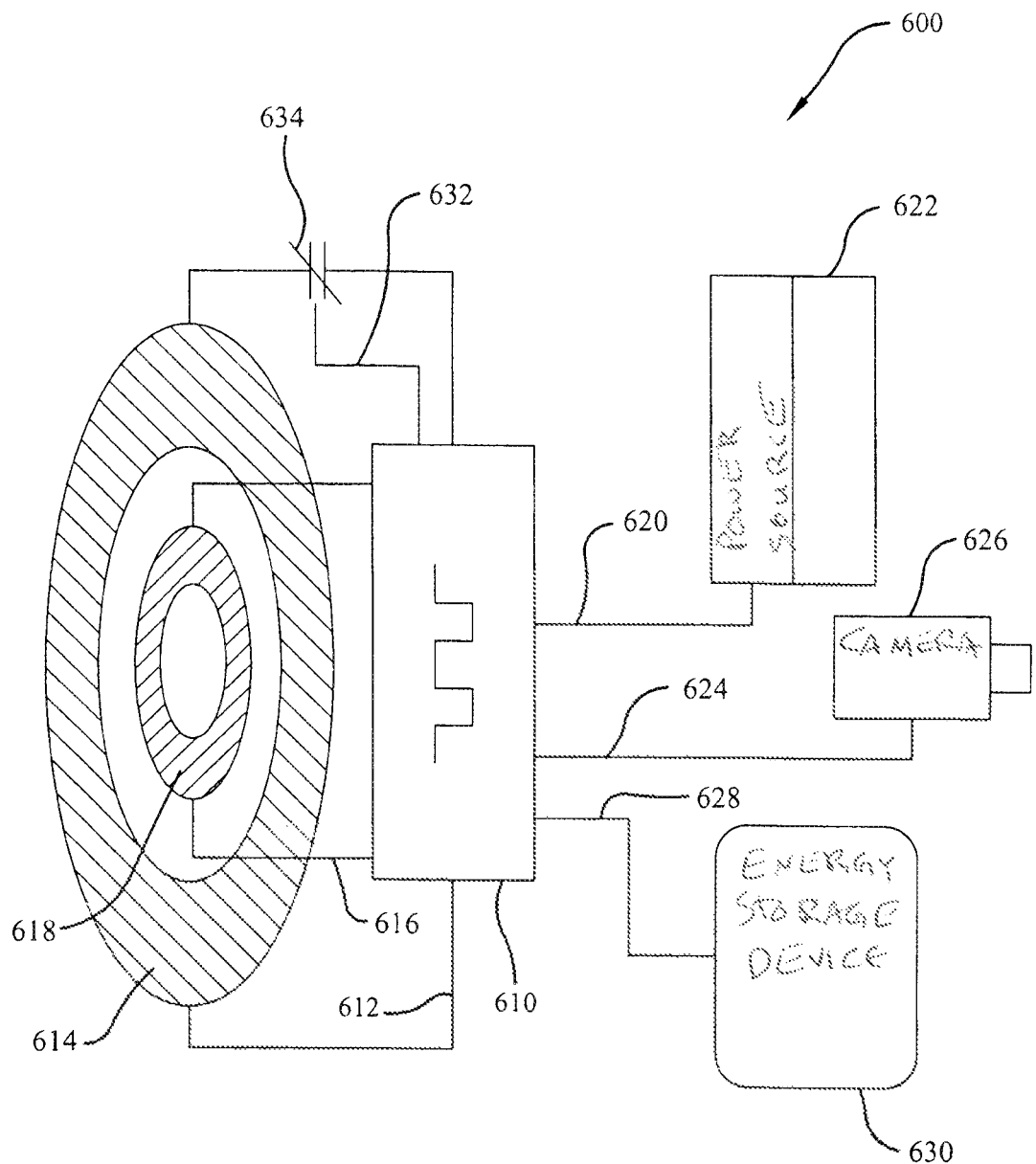
FIG. 6 depicts one embodiment of a remote energy transfer system.

FIG. 6 depicts a remote energy transfer system 600 comprising a link controller 610, a power antenna interface 612 operatively coupling the link controller 610 to a power antenna 614, a data antenna interface 614 operatively coupling the link controller 610 to a data antenna 618, a power device interface 620 operatively coupling the link controller 610 to a power source 622, and at least one data device interface 624 operatively coupling the link controller 610 to a camera 626. In this embodiment, the power source 622 comprises a solar cell.

The system depicted in FIG. 6 further comprises an energy storage interface 628 operatively coupling the link controller 610 and an energy storage device 630. The system also comprises a variable component control interface 632 operatively coupling the one link controller 610. The variable component control interface 632 controls a variable component 634, which adjusts the energy transfer and the data transfer in the system.

Figure 7:
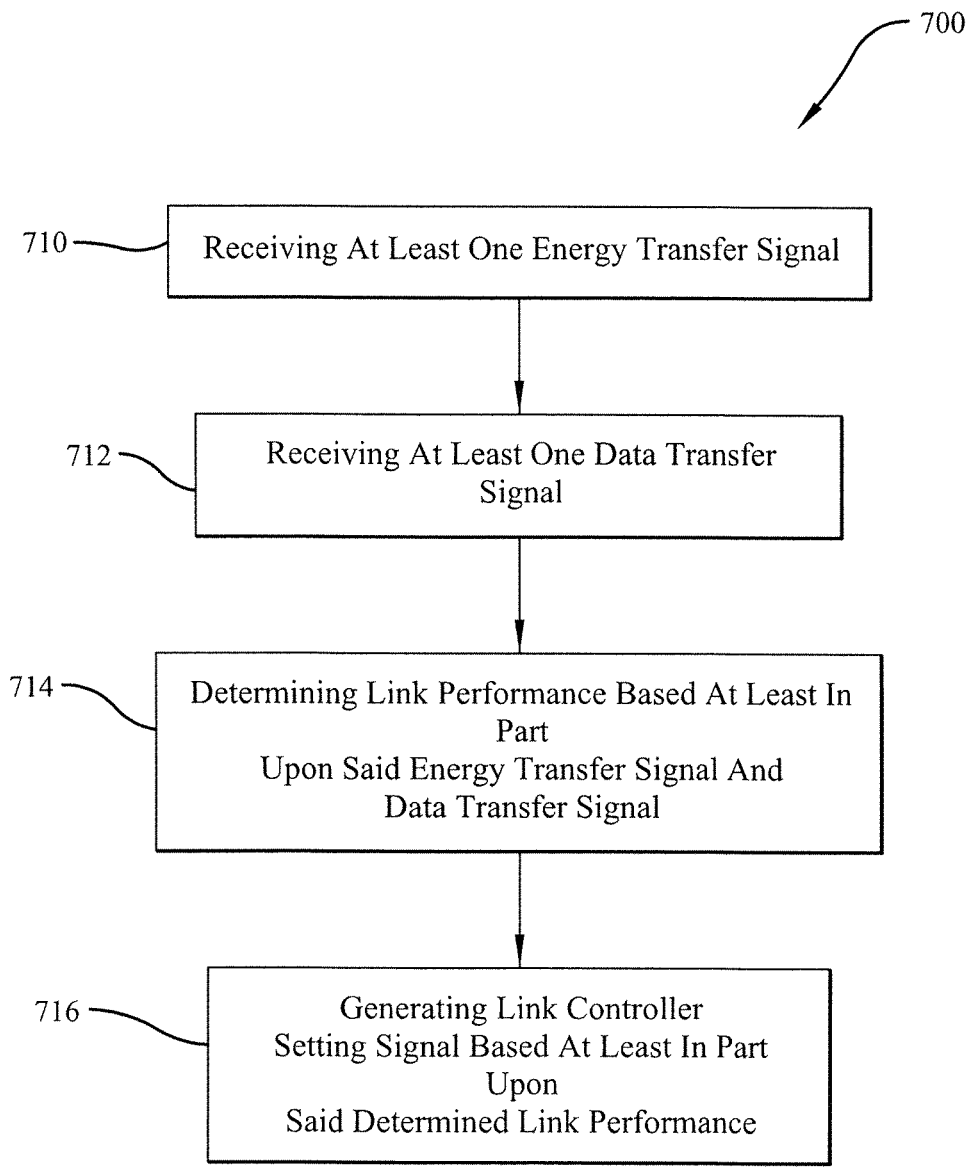
FIG. 7 depicts a method of remote energy transfer according to one embodiment.

FIG. 7 shows and describes a method of remote energy transfer 700 comprising the steps of receiving 710 at least one energy transfer signal, receiving 712 at least one data transfer signal, determining 714 a link performance based at least in part upon the data transfer signal, and generating 716 a link controller setting signal based at least in part upon the determined link performance.

Figure 8:
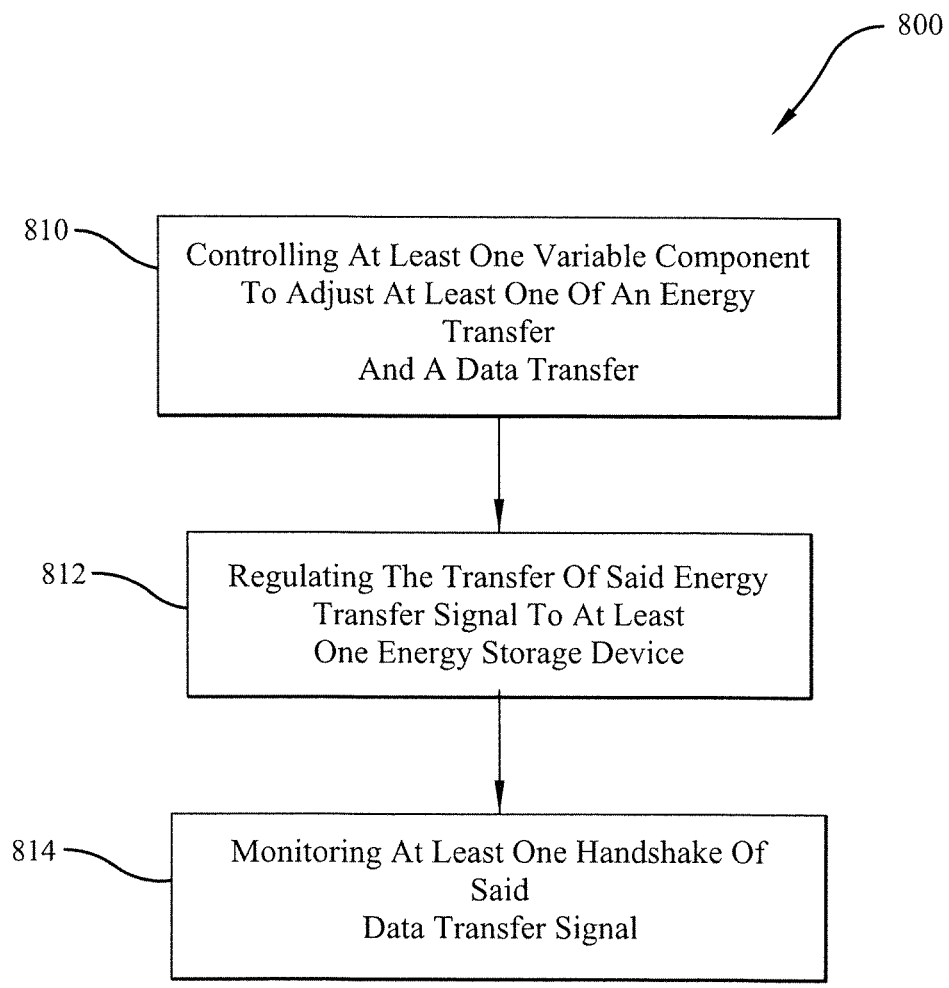
FIG. 8 depicts a method of remote energy transfer according to one embodiment.

FIG. 8 depicts and describes a method of remote energy transfer 800 further comprising the step of controlling 810 at least one variable component to adjust the energy transfer and the data transfer, controlling 812 at least one energy storage device to regulate the energy transfer signal to the energy storage device, and monitoring 814 the handshake of the data transfer signal and triggering an alarm upon interruption of the monitored handshake.

Figure 9:
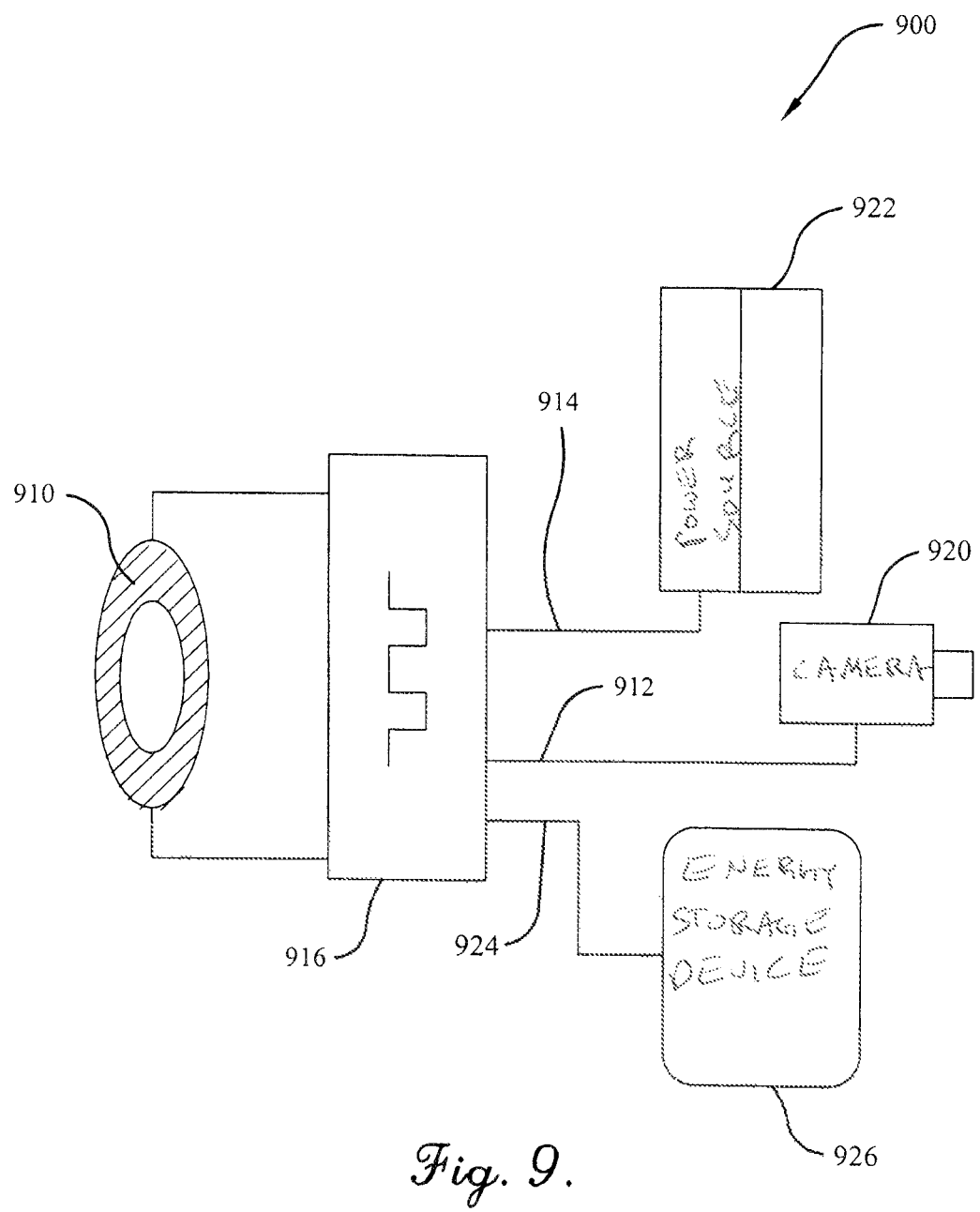
FIG. 9 shows one embodiment of a remote energy transfer system.

FIG. 9 depicts a remote energy transfer system 900 comprising at least one data antenna 910, a data device interface 912, and a power input interface 914. The system also comprises a link controller 916 operatively coupled to the data antenna 910, which controls the data input from the data device 920 and the power input from the power source 922. In this embodiment, the data device comprises a camera and the power source comprises a solar cell. The system further comprises an energy storage interface 924 operatively coupling an energy storage device 926 to the link controller 916.

While the making and using of various exemplary examples of the disclosure are discussed herein, it is to be appreciated that the present disclosure provides concepts which may be described in a wide variety of specific contexts. It is to be understood that the system and method may be practiced with a wide variety of power devices and a wide variety of data devices. For purposes of clarity, detailed descriptions of functions, components, and systems familiar to those skilled in the applicable arts are not included. The methods and system of the disclosure provide one or more advantages including which are not limited to remote charging of power sources, remote monitoring of security devices, remotely powered security access, remote multimedia data transfer of video and/or sound, remote transfer of secure identification data allowing various consumer and financial transactions, and the like. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

What is claimed is:

1. A remote energy transfer system, said system comprising:
   at least one power antenna;
   at least one data antenna, wherein said data antenna comprises a tapped portion of said power antenna;
   at least one link controller operatively coupled to said power antenna and data antenna, wherein said link controller is configured to at least partially control the energy transfer from said power antenna and the data transfer from said data antenna; and
   at least one data device communicably coupled to said link controller, wherein said data device comprises a security camera, a motion detector, an infrared detector, a keypad, or combinations thereof.

2. The remote energy transfer system of claim 1 wherein said link controller comprises at least one transceiver.

3. The remote energy transfer system of claim 1 wherein said link controller comprises at least one transmitter.

4. The remote energy transfer system of claim 1 wherein said link controller comprises at least one receiver.

5. The remote energy transfer system of claim 1 further comprising at least one energy storage device operatively coupled to said link controller.

6. The remote energy transfer system of claim 5 further comprising at least one power source operatively coupled to said energy storage device, wherein said power source comprises a solar cell, a piezoelectric energy harvesting element, a radio frequency harvesting element, an electrostatic discharge harvesting element, a Seebeck energy harvesting element, an alternating current driven power supply, a direct current driven power supply, or combinations thereof.

7. The remote energy transfer system of claim 1 wherein said operable coupling of said link controller is bidirectional.

8. The remote energy transfer system of claim 1 wherein said operable coupling of said link controller is unidirectional.

9. The remote energy transfer system of claim 1 further comprising:
   at least one secondary power antenna operatively coupled to said power antenna;
   at least one secondary data antenna operatively coupled to said data antenna; and
   at least one secondary link controller operatively coupled to said secondary power antenna and said secondary data antenna, wherein said secondary link controller is operably coupled to said link controller.

10. The remote energy transfer system of claim 1 wherein said system comprises a security system or fish finding system.

11. A method of remote energy transfer, said method comprising the steps of:
    receiving at least one energy transfer signal;
    receiving at least one data transfer signal;
    determining a link performance at least partially based upon said energy transfer signal and said data transfer signal;
    generating a link controller setting signal based upon said determined link performance;
    monitoring at least one handshake of said data transfer signal, wherein an alarm is triggered if said handshake is interrupted; and
    controlling at least one variable component to adjust said energy transfer signal.

12. The method of remote energy transfer of claim 11 further comprising the step of regulating the transfer of said energy transfer signal to at least one energy storage device.

13. The method of remote energy transfer of claim 11 further comprising a security system or fish finder system configured to perform one or more of the preceding steps.

14. A method of remote energy transfer, said method comprising the steps of:
    receiving at least one energy transfer signal;
    receiving at least one data transfer signal;
    determining a link performance at least partially based upon said energy transfer signal and said data transfer signal;
    generating a link controller setting signal based upon said determined link performance; and
    monitoring at least one handshake of said data transfer signal, wherein an alarm is triggered if said handshake is interrupted.

15. The method of remote energy transfer of claim 14 further comprising the step of controlling at least one variable component to adjust said energy transfer signal and said data transfer signal.

16. The method of remote energy transfer of claim 14 further comprising the step of regulating the transfer of said energy transfer signal to at least one energy storage device.

17. The method of remote energy transfer of claim 14 further comprising a security system or fish finder system configured to perform one or more of the preceding steps.

18. The remote energy transfer system of claim 1 further comprising at least one secondary power antenna operatively coupled to said power antenna.

19. The remote energy transfer system of claim 1 further comprising at least one secondary data antenna operatively coupled to said data antenna.

20. The remote energy transfer system of claim 1 further comprising at least one secondary link controller operatively coupled to a secondary power antenna and a secondary data antenna, wherein said secondary link controller is operably coupled to said link controller.

* * * * *